J. A. LAUGHLIN.
COMBINED CAR FENDER AND BRAKE.
APPLICATION FILED JULY 29, 1912.
1,077,285.
Patented Nov. 4, 1913.
2 SHEETS—SHEET 1.
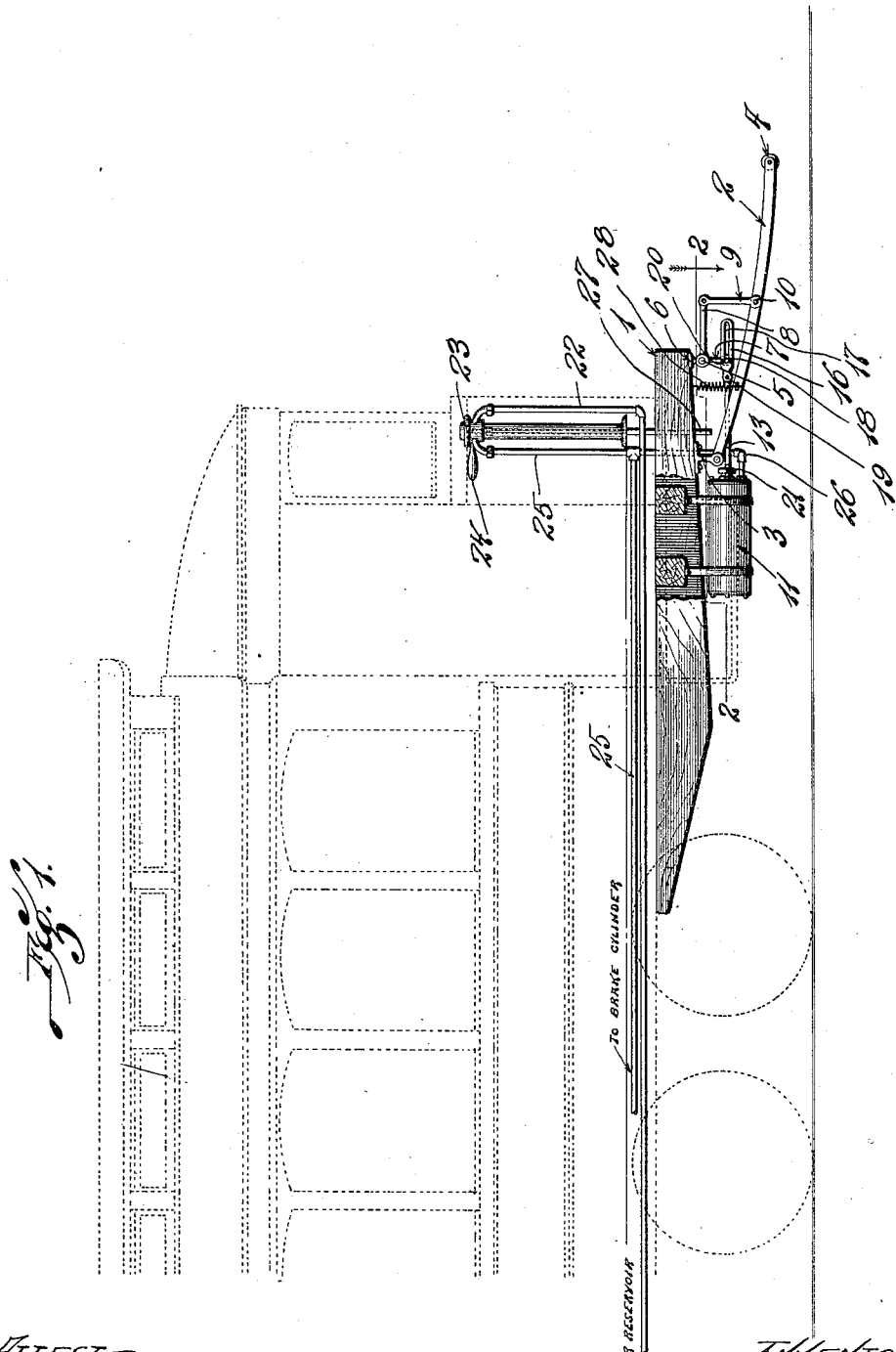

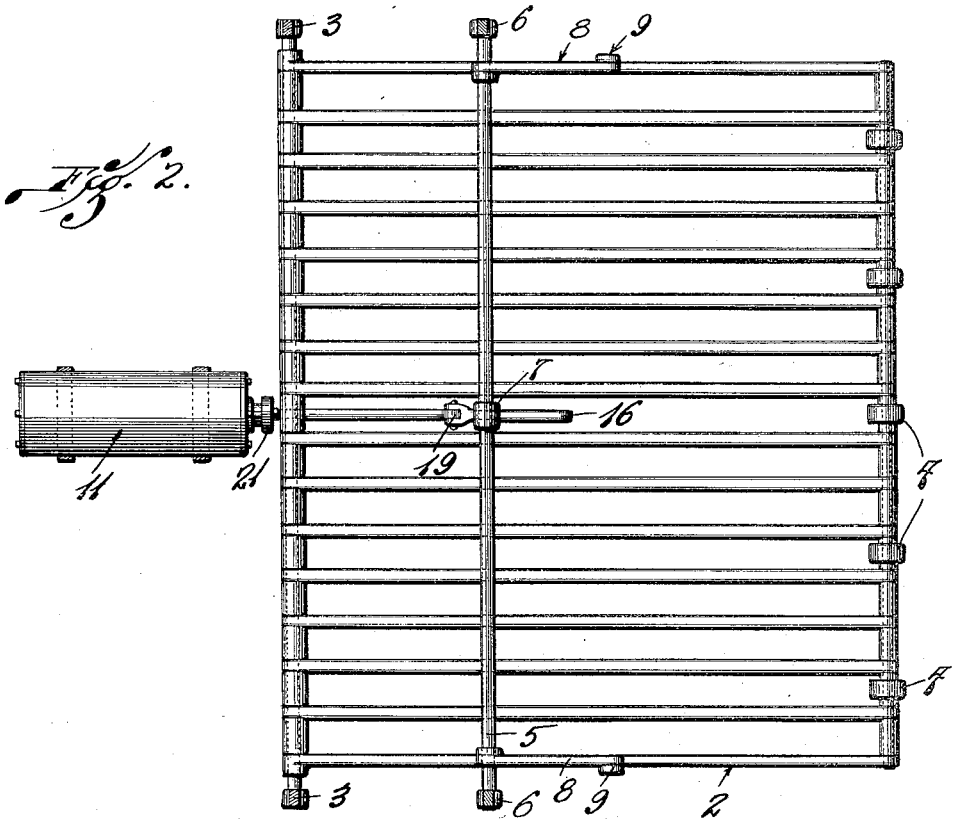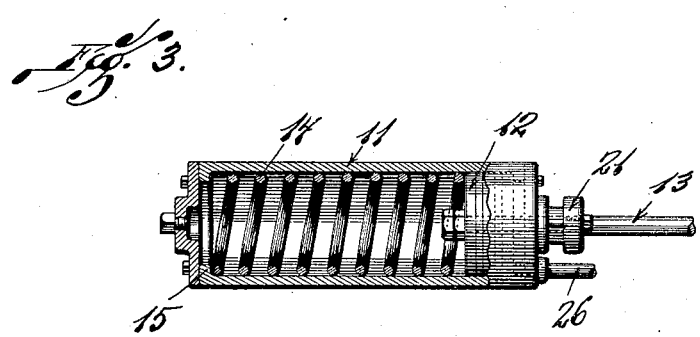

UNITED STATES PATENT OFFICE.

JAMES A. LAUGHLIN, OF ST. LOUIS, MISSOURI.

COMBINED CAR FENDER AND BRAKE.

1,077,285.   Specification of Letters Patent.   Patented Nov. 4, 1913.

Application filed July 29, 1912. Serial No. 712,108.

*To all whom it may concern:*

Be it known that I, JAMES A. LAUGHLIN, a citizen of the United States, and resident of St. Louis, Missouri, have invented certain new and useful Improvements in Combined Car Fenders and Brakes, of which the following is a specification containing a full, clear, and exact description, reference being had to the accompanying drawings, forming a part hereof.

My invention relates to an improved combined car fender and brake, and consists in the novel construction hereinafter described and particularly designated in the appended claims.

The object of my invention is to provide an improved fluid-operated means for forcing directly down the front end of the car fender, and retaining the same in contact with the rails or ground, whenever the motorman's brake-valve handle is thrown to an " emergency stop " position; or in other words, to quickly drop the front end of the fender automatically whenever the brake handle is placed in position for an " emergency stop."

With the brakes and fenders now in public use the multitudinous duties of the motorman in manipulating the brake handle, motor controller, and fender dropping lever, have served in many cases to confuse him so that he has neglected to promptly depress the front end of the fender in emergencies, with the result that many persons have been thrown beneath the car wheels, with serious results to life and limb. By the use of my invention, the front end of the fender will be instantaneously thrown directly to the ground by one and the same movement of the brake handle whenever an " emergency stop " is to be made, thus preventing the fender from passing over the limbs or body of a person who may be accidentally struck by the fender.

In the drawings: Figure 1 is a sectional side elevation of portions of the front end of a car having my invention applied thereto; Fig. 2 is a sectional plan view of a fender and the fender cylinder, the section being taken on the line 2—2 of Fig. 1; and Fig. 3 is a sectional side elevation of one form of fender cylinder.

The numeral 1 indicates the usual platform sills of the car, to which is pivotally connected the rear end of the fender 2, the usual pivot brackets 3 being used to pivotally connect the pivot-shaft 3ª of the fender to the said sills.

The numeral 4 indicates a series of small rollers or wheels mounted upon the front end of the fender, for the purpose of supporting the front end of the fender in close proximity to the rails or ground and also for preventing the fender from being injured by contact with the ground.

The numeral 5 indicates a rock shaft mounted in brackets 6 beneath the sills 1, but above the fender 2.

The numeral 7 indicates a vertical rocker arm fixed upon the said rock shaft 5, at or near the center of the length of said rock-shaft.

The numeral 8 indicates horizontal rocker arms, the rear ends of which are fixed to said rock shaft, and the opposite ends of which arms are pivotally connected to vertical links 9 to raise and lower the front end of the fender, the lower ends of said links 9 being pivotally connected at 10 to the underlying longitudinal bars of the fender.

The numeral 11 indicates a common fluid pressure cylinder, which is fitted in the usual manner to the under side of the car, and in which operates a piston 12 having the usual piston rod 13. Within the cylinder 11 is a coil spring 14, the purpose of which is to normally retain the piston 12 at one end of said cylinder, the said spring bearing against the said piston and against a shoulder 15 formed upon the interior of said cylinder. The outer end of said piston rod 13 is pivotally connected to the lower end of said rocker arm 7 by means of a link 16 having a slot 17 in which projects a pin 18 extending laterally from the lower end of said arm. The said link 16 is pivotally connected to the said piston rod 13 at 19, and a split pin 20 is passed through an aperture in the said pin 18 to retain the said link in position upon said pin. The piston rod 13 operates through the usual stuffing box 21.

The car is of course fitted with the usual fluid pressure brake apparatus, from the reservoir of which (not shown) extends the usual supply pipe 22, connecting said reservoir to the customary motorman's brake valve 23. Said brake valve has the usual brake handle 24, by means of which the motorman admits the air from the reservoir pipe 22 to the brake cylinder pipe 25, and also exhausts the air from the brake cylinder (not shown) through the brake cylinder pipe 25, and also the same brake handle is used for directing the air from the brake cylinder pipe to the fender cylinder 11 by means of a branch pipe 26, so that whenever a sufficient pressure is admitted to the fender cylinder, the said spring 11 will be compressed and the fender dropped, each time the brakes are applied in making an "emergency stop."

The numeral 27 indicates the usual exhaust pipe connected to the brake valve 23 in the usual manner, so that when the brakes are released after making an "emergency stop" the fender will also be released from its depressed position.

The operation will be readily understood without further explanation except to say that when the slotted link 16 is used the piston rod 13 will have considerable "lost motion" at each application of the brakes, without depressing the fender, and the fender will only be depressed when the brakes are applied to make an "emergency stop."

If desired, suitable springs 28 may be connected to the fender and to the platform sills 1 for the purpose of normally supporting the fender in an elevated position.

I claim:

1. A fender fulcrumed so that its front end may be forced to the ground, in combination with fluid-operated means for forcing to the ground the said front end of the fender whenever the motorman's brake-valve handle is thrown to an "emergency stop" position, a slotted connection to permit a limited movement of said fluid-operated means without moving said fender, and means for returning the fender to its normal position after an "emergency stop" has been made.

2. A pivotally mounted fender, in combination with a brake-valve, a brake-valve handle, a reservoir pipe for supplying air to said brake-valve, an exhaust pipe connected to said brake-valve, a brake cylinder pipe connected to said brake-valve, a fender cylinder pipe also connected to said brake-valve, a fender-cylinder, a piston in said cylinder, a spring in said cylinder for moving said piston in one direction, a rock shaft mounted above said fender, a rocker arm fixed upon said rock shaft, a piston rod connected to said piston, means for connecting said piston rod to said rocker arm, horizontal rocker-arms having one end fixed to said rock-shaft, and links pivotally connecting said horizontal rocker-arms to the said fender.

3. A pivotally mounted fender, in combination with a brake-valve, a brake-valve handle, a reservoir pipe for supplying air to said brake-valve, an exhaust pipe connected to said brake-valve, a brake cylinder pipe connected to said brake-valve, a fender cylinder pipe also connected to said brake-valve, a fender-cylinder, a piston in said cylinder, a spring in said cylinder for moving said piston in one direction, a rock shaft mounted above said fender, a rocker arm fixed upon said rock shaft, a piston rod connected to said piston, a slotted connection between said piston rod and said rocker arm to permit movement of the piston rod without moving said rocker arm, horizontal rocker-arms having one end fixed to said rock-shaft, and links pivotally connecting said horizontal rocker-arms to the said fender.

In testimony whereof I have signed my name to this specification, in presence of two subscribing witnesses.

JAMES A. LAUGHLIN.

Witnesses:
E. L. WALLACE,
JOHN C. HIGDON.

---

Copies of this patent may be obtained for five cents each, by addressing the "Commissioner of Patents, Washington, D. C."